United States Patent [19]

Huck

[11] 4,352,469

[45] Oct. 5, 1982

[54] SPOOL FOR PHOTOGRAPHIC FILM

[75] Inventor: William V. Huck, White Bear Lake, Minn.

[73] Assignee: Minnesota Mining and Manufacturing Company, St. Paul, Minn.

[21] Appl. No.: 282,647

[22] Filed: Jul. 13, 1981

[51] Int. Cl.³ ..................... B65H 75/18; B65H 75/28
[52] U.S. Cl. .................................... 242/71.8; 242/74
[58] Field of Search ..................... 242/71.8, 74, 68.5, 242/125.1

[56] References Cited

U.S. PATENT DOCUMENTS

| | | | |
|---|---|---|---|
| 2,180,829 | 11/1939 | Kolmodin | 242/71.8 |
| 3,161,370 | 12/1964 | Schwartz | 242/74 |
| 3,395,872 | 8/1968 | Faftori | 242/71.8 |
| 3,648,944 | 3/1972 | Fujiwara | 242/74 |

FOREIGN PATENT DOCUMENTS

| | | | |
|---|---|---|---|
| 1197839 | 8/1962 | Fed. Rep. of Germany | 242/71.8 |
| 1343082 | 1/1974 | United Kingdom | 242/71.8 |

Primary Examiner—Edward J. McCarthy
Attorney, Agent, or Firm—Cruzan Alexander; Donald M. Sell; Mark A. Litman

[57] ABSTRACT

Spools comprising a core or hub and two flanges concentric with the core or hub which are used to carry either unexposed photographic film for use in a camera, imaged film prior to development, or developed film for use in a viewer have different constructions in the field of microfilm because of different functional requirements for the spools. Because of the expense of shipping and inconvenience of reuse of the spool for unexposed film, the spool is generally discarded. By putting a fracturable or removable line from the outermost edge of one flange to the core, the spool for unexposed film may be converted to a spool for developed film.

7 Claims, 4 Drawing Figures

SPOOL FOR PHOTOGRAPHIC FILM

TECHNICAL FIELD

Spools are generally used to secure and carry strips or the like of resiliently flexible materials such as photosensitive film. The spools generally consist of a hub or core having two flanges which extend generally perpendicularly from the surface of the hub or core so as to define a space within which strips or the like may be wound about the core. The core is usually cylindrical with a circular crossection and the flanges are also usually circular and concentric with the core.

Spools used to carry photosensitive film must be able to partially protect the film from exposure to light and therefore the flanges are both continuous and opaque to light. Spools used to carry developed film need not be continuous or opaque and, in fact, for some constructions, such as for use with microfilm, it is desirable if not necessary to have an opening in one of the flanges which extends from the exterior of the flange to the interior of the core. This opening enables the user to insert the film into the core where it can be locked securely while at the same time placing the film between the flanges so that it may be wrapped about the core.

The present invention enables spools which can be used for containment of photosensitive film to be used for the carrying of developed film.

BACKGROUND ART

Spools for carrying photosensitive or developed photographic film are well known in the art. Spools used for microfilm are generally standardized according to dimensions provided by the American National Standards Institute, Inc. in ANSI PH1. 33-1972. During use of these spools, it is generally necessary to secure one end of the film to the core of the spool. U.S. Pat. No. 3,330,494 describes the general structure of such a spool. In order to secure the film to the core of such a spool, various locking mechanisms have been devised. U.K. Pat. No. 1,343,082 discloses a core having a slot in its surface which leads to a cavity within the core. Film is slid between the flanges and is inserted into the core through the slot to lock it into place. Not only is it somewhat difficult to thread the film into the slot, but also the locking mechanism in the core is not as secure as is desirable.

Locking mechanisms are commercially available for use with spools having a slit on at least one flange from the exterior edge of the flange to the interior of the core which intersects a slot in the core. These locking mechanisms comprise flexible polymeric segments in various forms which can be compressed to fit easily within a section of the core and which then expand to secure the segment within that section. By providing a slot in the segment to lodge the end of the film strip, the film can be directed to pass around the segment before it passes through the slot in the core. The expanded segment will therefore press the film strip against a surface in the core and lock it into place. These locking mechanisms require an existing slit in at least one flange which intersects the slot in the core. These mechanisms are therefore not useful for holding developed film on spools used for photosensitive film which must have flanges that are opaque and continuous.

BRIEF DESCRIPTION OF THE INVENTION

A spool is provided which includes a hub or core and a pair of opaque spaced flanges secured to the hub. The flanges extend away from the core and are generally concentric therewith. The flanges are usually secured at the ends of the core.

The core itself has a hollow section within it and a slot or weakened area which can be broken to form a slot running approximately axially along the surface of the core. The outer part of the core generally comprises a cylindrical surface about which the film is to be wound.

At least one of the flanges extending away from the core has a weakened area or removable portion thereon which extends from about the outer edge of the flange to the core and intersects the core at or about the slot. The weakened or removable area should not allow light to pass into the area between the flanges. This spool can be used for photosensitive film in the normal manner and after the film has been exposed and developed, the weakened area can be broken or the removable area removed to provide a slit or opening along the side of the flange. The same spool can then be used to house developed film and enable conventional locking of the film onto the core.

DETAILED DESCRIPTION OF THE DRAWINGS

Figure 1:
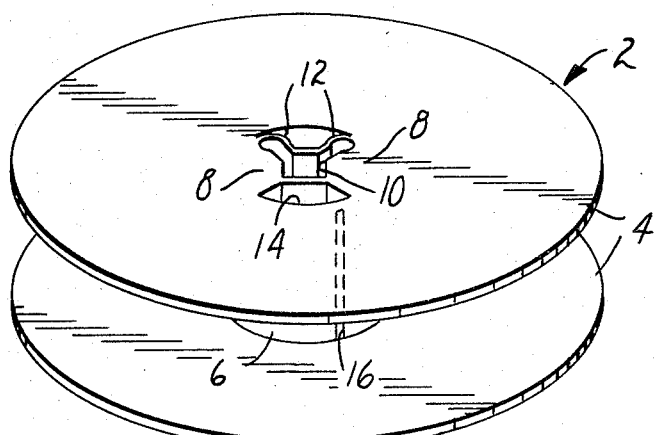
FIG. 1 shows a perspective of a conventional microfilm spool.

FIG. 1 shows a conventional microfilm spool 2 having two flanges 4 extending radially from a cylindrical core 6. The core 6 is supported on its interior by solid segments 8 which define a rectangular spindle receiving aperture 10 and keyhole slots 12, as well as hollow area 14. A slot 16 extends across the core 6 to provide an opening into hollow area 14.

Figure 2:
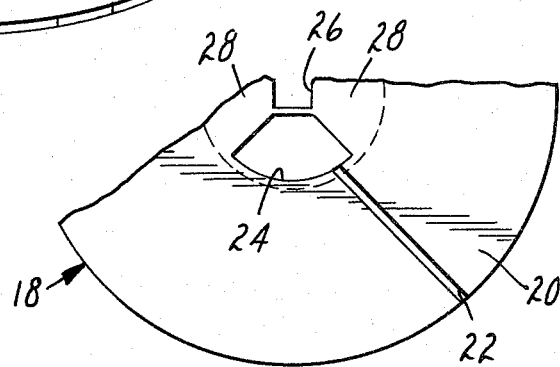
FIG. 2 shows a segment of a top view of a microfilm spool according to the practice of the present invention with a groove on one flange.

FIG. 2 shows a segmented top view of a microfilm spool 18 according to the present invention. The spool has at least one flange 20 with a groove 22 passing from the outer edge of the flange 20 to hollow area 24 within the core. Solid elements 28 are shown within the core which define the shape of the spindle receiving aperture 26.

Figure 3:
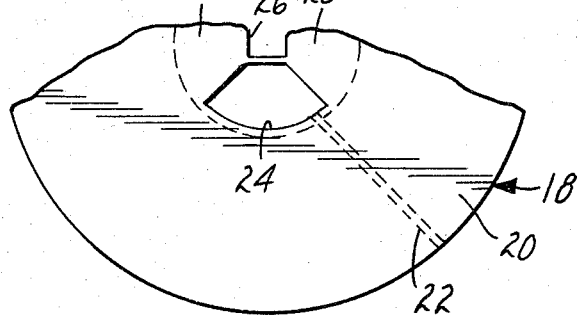
FIG. 3 shows a segment of a top view of a microfilm spool according to the practice of the present invention with a weakened line formed by indentations on a flange.

FIG. 3 shows a segment of a top view of an alternative microfilm spool 18 according to the practice of the present invention. A flange 20 is provided with a weakened area 22 formed by indentations in the surface of flange 20. Weakened area 22 extends into the hollow area 24 of the core. Solid sections 28 define the shape of the spindle receiving aperture 26.

Figure 4:
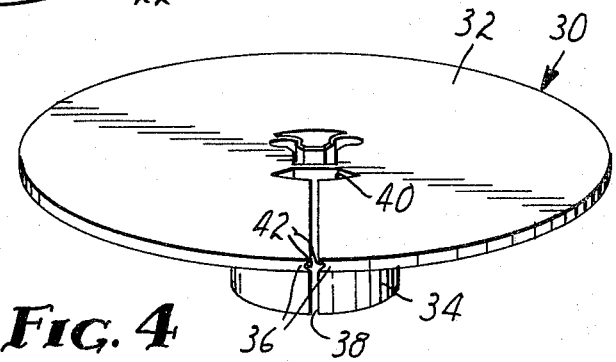
FIG. 4 shows a perspective of the top half of a microfilm spool according to the present invention. A gap extending from the outer edge of one flange to the core is shown.

FIG. 4 shows a side view perspective of half of a microfilm spool 30 according to an alternative practice of the present invention. A flange 32 which extends radially from a core 34 is provided with a gap that passes from the exterior of the flange to the slot 38 on the core 34. The gap is formed by a separation in the flange 32 which presents two opposed faces 36 within the plane of the flange 32. The opposed faces 36 are provided with channels 42 along which an insert could be provided. The gap and the slot 38 extend into hollow area 40 within the core 34.

DETAILED DESCRIPTION OF THE INVENTION

The core of the spool comprises an elongated, usually cylindrically shaped element having at least one hollow area within which film can be received and secured after passing through a slot on the surface of the core. The interior of the core, in addition to the hollow section, contains a spindle receiving aperture which usually extends axially completely through the core. The aperture is shaped so as to receive and/or secure a spindle therein. The shape may be square, rectangular, or any other shape which can secure a spindle, including, for example, circular with saw-teeth edging on the interior surface. The conventional microfilm aperture includes a rectangular slot in combination with a keyhole slot, usually extending radially from adjacent corners of the slot. The core may be additionally formed of a plurality of cavities extending across the spool between the outer surface of the core and the inner surface which can also form the spindle receiving aperture. These cavities merely act to reduce the amount of material necessary in the construction of the spool and may be closed off by end plates at the extremities of the core.

The flanges are generally concentric with the core and tend to extend perpendicularly from the surface of the core. This is not essential, however, and, in fact, it is often preferred to have the flanges separated further at their extremities than where secured to the hub. This would facilitate unwinding of the film and removal of the spool from a mold.

A weakened path is formed along one of the flanges which extends from approximately the outer edge to the surface of the core. The weakening need only extend so far as to enable any break formed in the weakened area to be extended to the necessary limits, but, of course, weakening the flange all the way to the edge and core is preferred. The weakening should not be so great as to enable passage of light into the area between the flanges. To that end, a series of perforations would not be suitable. It is generally preferred that a series of indentations or a single channel be made in the surface to define a weakened path. The path need not be a radial line or even a straight line from the outer edge of the flange to the core, but that is the simplest construction. A curved or wavy path could be employed although this is not believed to provide any particular benefits.

Rather than a weakened portion, a removable portion could be inserted into a spool with an existing slot extending from the outer edge of the flange to the core. For example, the inner edges of the slot in the flange could have tracks or indentations into which a fitted element could slide. This would enable the spool to be used repeatedly for either photosensitive or developed film. An opaque tape could also be secured over the slot, but this is the least desired construction because the tape could become unsecured within the camera, projector or viewer.

The most preferred construction is the use of a radial groove on the exterior surface of one of the flanges which extends from the outermost edge of the flange to the core so that it intersects the core at or about the slot or an area weakened sufficiently to form a slot.

By the term weakened area, it is meant that one portion of the flange is more readily subject to cracking, breaking or splitting by hand pressure or machine pressure than adjacent or surrounding areas. The degree of weakening can vary over a board range. It is generally assumed that the weakened area should break or split at less than 95 or 90% of the force required to break or split the unweakened areas. Preferably the weakened area should break at less than 75 or 70% that force, and most preferably less than 50 or 25% that force.

The spool may be composed of any opaque polymeric material. This may include polyesters, polyvinyl chloride, polyolefins, polycarbonates, polyacrylates, polyamides, and the like. These may be rendered opaque by any of the known art techniques. It is preferred to use fillers, pigments and/or dyes to render the polymers opaque, but metallized coatings or paints may be used to the same effect.

EXAMPLE

A commercially available microfilm spool for photosensitive film was used. This spool had a typical construction of two flanges extending radially from a cylindrical core. The core had a rectangular spindle receiving aperture with two keyhole shaped slots extending from adjacent corners of the aperture. A slot extended longitudinally on the core and provided a passageway from the area between the flanges into an exposed hollow area of the core. A groove was cut in one of the flanges with a file. The groove extended to a depth of one-half the thickness of the flange and passed in a straight line radially on the flange from its outer edge to intersect with the slot on the core. The groove was, therefore, noted as being deep enough to form a weakened area but not so deep as to enable light to pass from the outside of the flange into the interior of the spool.

Photosensitive microfilm was wrapped about the core between the flanges under safe-light conditions. The microfilm was then exposed and developed under normal conditions. After development, the empty spool with the groove was securely grasped between two hands with the thumbs on the outside of the flange and on opposite sides of the groove. The forefinger were placed between the flanges, opposed to the thumbs. The flange was twisted so as to carefully break the groove along its entire length. The groove then formed an open channel which extended from the exterior of the flange to the slot on the core. The developed microfilm was readily slipped through the slot on the core and the open channel and secured into the hollow portion of the core with a commercially available locking device. The spool was then used without problems on a reader/printer.

The dimensions of the spools used in the Example satisfied all dimensional requirements of ANSI PH 1.33-1972 which standard is incorporated herein by reference for the disclosure of all dimensions of microfilm spools, for both 35 mm and 16 mm spools. The major dimensions for these spools are, respectively for 35 mm and 16 mm film, flange diameter (92.00+0-1.00 mm and 125.50±0.50 mm), and the gap between flanges and the core (34.10+0.40-0 mm and 16.23±0.18 mm).

The weakened area does not affect any of these important functional dimensions. The weakened area may be cut into existing spools or molded into new spools according to the practice of the present invention.

I claim:

1. A spool for photosensitive film comprising a core having at least one hollow area therein, a slot extending lengthwise on the core, which opens into said at least one hollow area, two flanges extending radially from said core, a spindle receiving aperture in said core, and wherein both the core and the flanges are opaque, said spool being characterized by at least one of said flanges having a weakened or removable portion which extends from the outer edge of said at least one flange to intersect the core at or about said slot.

2. The spool of claim 1, wherein at least one of said flanges has a weakened area which extends from the outer edge of said at least one flange and intersects said slot.

3. The spool of claim 2, wherein said weakened area is a groove.

4. The spool of claim 2, wherein said weakened area is a line of indentations.

5. The spool of claim 1, wherein at least one of said flanges has a removable portion which extends from the outer edge of said at least one flange to intersect said slot.

6. The spool of claim 1, wherein said removable portion slideably engages a groove on said at least one flange.

7. The spool of claim 6, wherein said at least one flange has a linear slot extending from the exterior edge of said at least one flange to intersect the slot on said core and the groove has at least two channels, one on each side of said linear slot and extending along said linear slot.

* * * * *